United States Patent

McClymonds

[11] Patent Number: 5,601,258
[45] Date of Patent: Feb. 11, 1997

[54] SPACECRAFT SHIELD

[75] Inventor: Ken A. McClymonds, Irvine, Calif.

[73] Assignee: McDonnell Douglas Corporation, Huntington Beach, Calif.

[21] Appl. No.: 280,076

[22] Filed: Jul. 25, 1994

[51] Int. Cl.$^6$ .................................................... B64G 1/22
[52] U.S. Cl. ........................... 244/158 R; 89/36.01; 89/36.11; 428/34.5; 428/34.6; 428/35.8; 428/36.1; 428/408; 428/902; 428/911
[58] Field of Search ........................... 428/34.5, 246, 428/251, 252, 285, 902, 911, 158 R, 34.6, 35.8, 35.9, 36.1, 408; 244/158 R; 89/36.01, 36.11

[56] References Cited

U.S. PATENT DOCUMENTS

| | | | |
|---|---|---|---|
| 3,439,885 | 4/1969 | Sackleh | 244/1 |
| 3,569,714 | 3/1971 | Anderson et al. | 250/108 |
| 3,924,038 | 12/1975 | McArdle | 428/49 |
| 4,314,682 | 2/1982 | Barnett et al. | 244/158 R |
| 4,868,040 | 9/1989 | Hallal et al. | 428/251 |
| 4,923,741 | 5/1990 | Kosmo et al. | 428/252 |
| 4,926,963 | 5/1990 | Snyder | 181/296 |

FOREIGN PATENT DOCUMENTS 2124887  2/1984  United Kingdom.

OTHER PUBLICATIONS

Cour–Palais, B. G. and Crews, J. L. (1990) "A Multi Shock Concept for Spacecraft Shielding" Int. J. Impact Engng vol. 10, pp. 135–146.

Crews, J. L. and Christiansen, E. L. (1992) "The NASA JSC Hypervelocity Impact Test Facility (HIT–F)" AIAA Paper No. 92–1640.

Christiansen, E. L. (1992) "Performance Equations for Advanced Orbital Debris Shields" AIAA Paper No. 92–1462.

Primary Examiner—James J. Bell

[57] ABSTRACT

A shield for protecting spacecraft from impact with particles having a wide range of velocities includes three elements. Sets of spacers are used to secure the elements in positions in which they are separated from each other selected distances. The bumper element is the outermost element and is composed of ceramic fabric material or tin and is utilized to vaporize or melt a high velocity particle upon impact therewith. The intermediate element is a cloud stopper element and is composed of a metallic layer over a graphite epoxy layer and is used to absorb small fragments resulting from high velocity impacts with the bumper element. The innermost element is a fragment stopper element and is utilized to absorb low velocity particles. The shield elements generally enclose the spacecraft and are mounted onto hardpoint end portions of the spacecraft so that impact forces are not transmitted directly to impact sensitive portions of the spacecraft. The spacing of the elements generally prevents transmission of highly concentrated impact forces to successively inwardly positioned elements of the shield thereby preventing impact damage to the spacecraft.

21 Claims, 2 Drawing Sheets

SPACECRAFT SHIELD

BACKGROUND OF THE INVENTION

The invention relates generally to shielding structures, and, more particularly, to such shielding structures which are capable of protecting spacecraft components from critically damaging impact with a variety of space particles having a wide range of velocities and angles of approach such as meteorites and orbital debris. The invention addresses the fact that each impact causes some degree of damage to the shield itself and this damage can range from small holes in the outer protective layers to large (several inches in diameter) holes in the underlying protective layers. The invention incorporates elements that provide some degree of protection for subsequent impacts following the widespread damage to the shield system commensurate with defeat of the "design-size" particle.

Many different types of shields have been designed for protecting many types of vehicles as well as personnel from impact with ballistic projectiles and other types of impacting particles. Many of these shields include layers of fabric bonded together. An example of such a shield is disclosed in U.S. Pat. No. 4,923,741 to Kosmo. The Kosmo shield is specifically designed for spacesuits and spacecraft and has layers of fabric composed of low density and high density material which provide micrometeorite protection, radiation protection, etc. Some of these fabric layers include aramid fibers. However, a primary disadvantage of the Kosmo shield is that although it provides for a variety of different types of protection including radiation and thermal extremes, it is incapable of providing protection against both high and low velocity particle collisions.

Other prior art shields have been designed specifically for protecting personnel, equipment and vehicles from injury and damage caused by projectiles, bomb fragments and other products of explosives. An example of such a prior art shield for suppressing or reducing penetration by such particles is disclosed in U.S. Pat. No. 3,924,038 to McArdle. The McArdle design utilizes a ceramic outer layer and nylon felt layers backed by a metallic layer. The felt layers are stitched together into a cloth-like configuration. However, a primary disadvantage of such a shield is that it provides protection only against relatively low velocity particles such as bullets. The selection of the different types of materials used in the McArdle design is specifically to allow effective shielding against a variety of shapes and sizes of particles rather than against particles having a wide range of velocities.

Another type of prior art shield design includes various shielding layers which are separated from the particular structure to be shielded. An example of such a shield is disclosed in U.S. Pat. No. 3,569,714 to Anderson. The Anderson shield provides protection from a variety of hazards including impacts with projectiles, temperature extremes and radiation. The Anderson shield includes a plurality of chambers positioned so that one is within the other and includes an open space between the outer and inner containers. However, as with the other prior art patented designs discussed hereinabove, the Anderson shield does not provide protection against a variety of high and low velocity impacting particles. Moreover, due to the particular mounting configuration and the particular shapes of the containers, the Anderson shield additionally has the disadvantage of not being able to provide protection equally from particles impacting the protected structure from all directions.

Other prior art patents for providing shielding for space and atmospheric vehicles include shells which are provided with inner walls therebetween. The inner walls define an area containing a material for providing protection against collision with projectiles. Such a shield is disclosed in U.S. Pat. No. 3,439,885 to Sackleh. The Sackleh shield incorporates bronze wool in the area and supports which are rods or ribs positioned between the outer and inner shells. The bronze wool is utilized to provide protection from low velocity projectiles. However, the outer shell is simply utilized to provide a smooth outer surface for the bronze wool which is the primary protection provided against projectile impacts. Consequently, as with the other prior art patents discussed hereinabove, the Sackleh shield does not provide protection against both high and low velocity particles.

What is therefore needed is a shield for spacecraft that provides generally complete protection against impacts from micrometeoroids and orbital debris particles having a wide range of impact velocities and angles of approach.

SUMMARY OF THE INVENTION

It is a primary object of the present invention to provide a shield for protecting spacecraft from impact with particles having a relatively wide range of velocities and angles of approach.

It is also an object of the present invention to provide a shield for spacecraft which provides protection from impact with a variety of types of particles.

It is also an object of the present invention to provide a shield for spacecraft which provides protection from impact with orbital debris.

It is another object of the present invention to provide a shield for spacecraft which provides protection from impact with micrometeoroids.

Spacecraft requiring shields against impacting particles are typically provided with single layer, thin aluminum bumpers called Whipple shields for providing protection for shell structures of the spacecraft against meteoroid particles. Since the meteoroids will collide with spacecraft and the bumpers at very high velocities, the Whipple shield fragments, melts or often vaporizes the particle and thereby disperses the energy over a much larger area of the underlying structure thereby reducing the impact loading per unit area. Thus, although the spacecraft might be impacted by the debris from this collision, if the impact parameters are within the design envelope the spacecraft can remain sufficiently intact to survive. However, for new large space structures and long duration low earth orbits, the shielding must protect the spacecraft from large particle impacts over a much broader range of velocities due to the increasing prevalence of orbital debris. In addition, some of the spacecraft have vulnerable components, i.e., large pressurized tanks or pressurized habitation modules having relatively thin walls. Since these types of spacecraft will have to endure impacts with both micrometeoroid high velocity particles as well as orbital debris having relatively low velocities, the Whipple shields, which provide protection predominantly from high velocity impacts, will not be able to provide adequate protection for these types of spacecraft.

Essentially, the shield of the present invention includes three structures which, in combination, provide protection to the spacecraft from both high and low velocity particles. These structures include an outer structure or bumper which provides protection from high velocity particles such as micrometeoroids. The micrometeoroids may be traveling at speeds of up to 100 kilometers per second. The bumper is not capable of stopping impacting particles such as micrometeoroids but, depending on impact conditions and materials, either vaporizes, melts or fragments the particle as well as the bumper material. However, in the absence of other shielding structures, these residual fragments, molten materials and gases may impinge upon the underlying spacecraft structure causing some degree of damage thereto. For this reason, the shield also includes an intermediate structure, a cloud stopper which is positioned generally inward of the bumper i.e., between the spacecraft and the bumper. The cloud stopper defeats the products of multiple high velocity particles/bumper interactions. The cloud stopper is designed to resist perforation by small fragments, fracture or excessive deflection from impulsive load and backface spallation caused by intense stress waves that may propagate through the thickness of the cloud stopper. Thus, the cloud stopper prevents the products of collision between high velocity micrometeoroids and the bumper from penetrating through the shield and causing damage to the spacecraft.

The bumper and cloud stopper together provide protection against relatively high velocity impacts that are normal to the shield surface. However, the bumper and cloud stopper are relatively ineffective against relatively low velocity particles that impact normal to the shield or that are produced as a result of medium velocity impacts at oblique angles to the shield surface. Consequently, a fragment stopper is provided and positioned between the cloud stopper and the spacecraft to stop any fragments that penetrate the cloud stopper and bumper. Thus, the fragment stopper is designed to prevent penetration by low velocity particles on the order of approximately one to two kilometers per second that could easily perforate the cloud stopper and bumper. In addition, the fragment stopper also generally prevents penetration by residual low velocity fragments resulting from medium velocity oblique impacts on the bumper or incidental spall fragments ejected from the backface of the cloud stopper.

Since it is crucial both that the projectile have enough space to vaporize after impact with the outer bumper sheet and that there be enough space to spread the load of impact over a sufficient area to minimize damage to both the shield and the underlying spacecraft, a selected spacing is provided between the shield structures described hereinabove. Thus, there is a particularly well-defined optimum spacing between the individual bumper sheets as well as between the bumper sheet and the cloud stopper and the fragment stopper structures. However, practical considerations may limit the number of layers and/or the spacings between them. Such embodiments can, nevertheless, effectively combat the impact effects. The spacing is preferably provided by means of a spacer structure positioned between the bumper, the cloud stopper and the fragment stopper. Thus, the spacers provide a means for support for the shield system as well as a means for transferring the impact loads to preferred spacecraft reaction locations or hardpoints.

The bumper is preferably composed of a fibrous ceramic woven material such as a Nextel 312, an alumina-boria-silica woven fabric, manufactured by the ceramic materials department of the 3M Corporation, Building 225-4N-07, 3M Center, St. Paul, Minn. 55144-1000. The bumper may also be composed of a 99.95% silica dioxide fibrous ceramic woven material such as Astroquartz II. Alternatively, the bumper sheets may be composed of tin, each preferably in a solid sheet thereof. The projectile at high velocities melts the tin so that there are no tin fragments except for the molten tin which sprays out in a conical volume having an approximately forty five degree angle. Consequently, this prevents transferrence of a significant highly concentrated load to the underlying structure. Similarly, the Nextel or Astroquartz II uses fibrous material without inclusion of a resin, so that it is composed simply of tiny fibers in a weave. Thus, when the projectile impacts the Nextel or Astroquartz II at very high velocities, the projectile melts and therefore does not produce any fragments other than the tiny fibers of the fabric. As a result, there are no fragments which are sufficiently large to produce any significant damage to the underlying structures. The bumper preferably comprises a plurality of sheets thereof spaced apart from each other a selected distance. The spacing distance is preferably established based on the application and spacecraft design requirements i.e., impacting particle size, mass, velocity and angle of incidence.

Since the spacecraft may be composed of relatively delicate or sensitive materials or have components thereof which may be sensitive to shock, the shield is preferably not connected directly to a thin walled structure of the spacecraft. Instead, the shield is preferably connected to hardpoints such as stiffening frames or beams of the spacecraft or to bosses on pressure vessel structures, or other structures which are relatively insensitive to impact loads.

DETAILED DESCRIPTION OF THE PREFERRED EMBODIMENT

Figure 1:
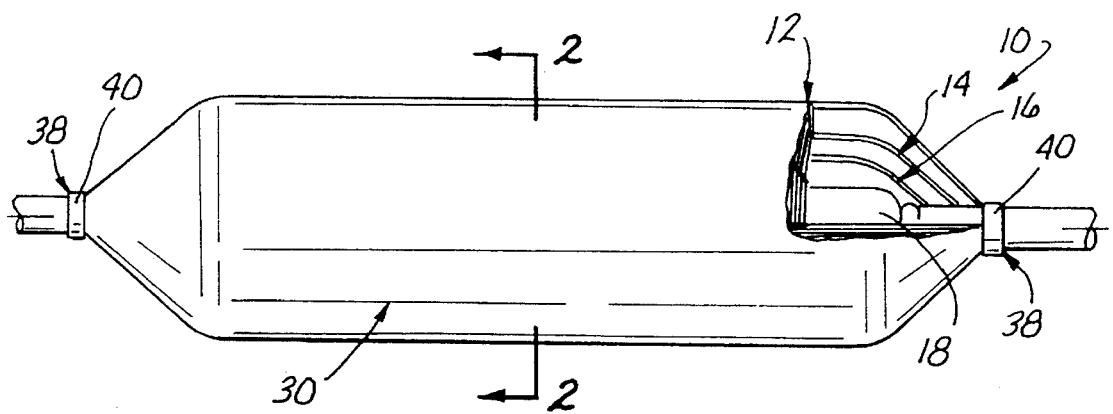
FIG. 1 is a perspective view of a first embodiment of the shield of the present invention showing the shield mounted on a spacecraft at hardpoint end structure portions thereof and showing a portion of the shield cut away to illustrate relative positioning of components thereof.

Referring now to the drawings, the shield of the present invention is generally designated by the numeral 10. The shield 10 includes a bumper structure or element 12. The bumper element 12 is preferably generally an outer structure 12 so that it can provide protection from an initial or first impact with particles such as micrometeoroids and orbital debris, as may be encountered by a spacecraft in orbit. The shield 10 preferably also includes an intermediate structure or cloud stopper element 14. The cloud stopper element 14 is preferably positioned generally inward of or within the bumper element 12 so that it is located generally between the bumper element 12 and the spacecraft 18. The shield 10 additionally includes a fragment stopper element 16 or inner structure 16. The fragment stopper 16 is preferably positioned so that it is generally within the cloud stopper element 14 and generally between the cloud stopper element 14 and spacecraft 18. The bumper element 12, the cloud stopper 14 and fragment stopper 16 preferably generally enclose the spacecraft 18, as shown. In addition, the elements 12, 14 and 16 are each generally in the shape of a capsule generally closed at the ends thereof, as shown in FIG. 1.

Figure 3:
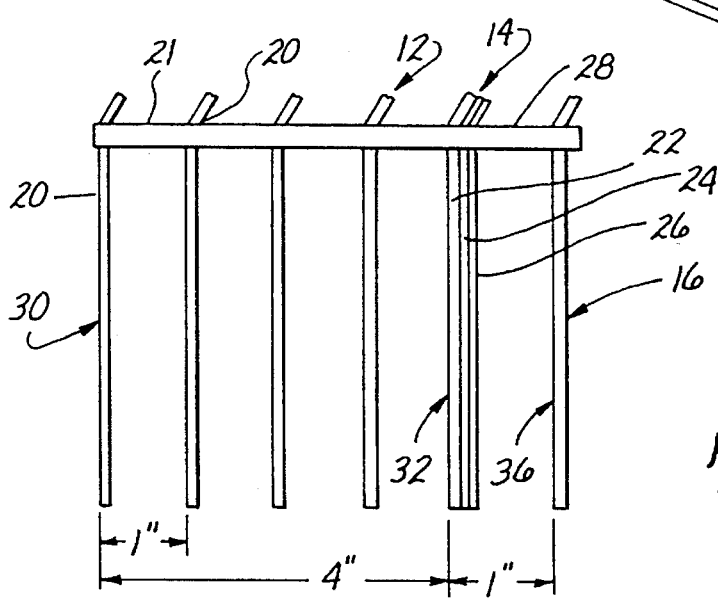
FIG. 3 is a sectional view of the bumper, cloud stopper and fragment stopper elements of the first embodiment of the present invention and showing the layers thereof.

The bumper element 12 preferably comprises a plurality of layers 20 of woven material composed of fine fabric. The bumper element layers 20 are preferably composed of a ceramic fabric material such as that sold under the trademark Nextel from the 3M Company or such as that sold under the trademark Astroquartz II. Such a woven material (or mesh or screen) is advantageous because it produces less secondary ejecta. There are preferably four ceramic fabric layers 20, although there may be more or less than this number, if desired. The fibrous ceramic layers 20 are preferably separated from each other in order to increase their effectiveness in stopping high velocity particles. The spacing of the layers 20 enables the impacting projectile to be melted or vaporized before striking the cloud stopper. At the same time, the secondary debris from the fabric bumper layers 20 consists of only fine fibers that impinge on underlying layers, and these fine fibers do not result in any significant damage to the underlying layers. For providing protection against a one-eighth inch diameter spherical aluminum particle, the spacing is preferably approximately one inch between outer surfaces of adjacent layers 20, as shown in FIG. 3. The layers 20 are preferably thin relative to the spacing between the adjacent layers 20, but the thickness of the layers 20 can vary according to the application and the size, velocity, etc. of the impacting particles from which protection is desired.

The Nextel or Astroquartz II layers 20 are preferably separated by bumper layer spacers 21 which provide the desired spacing between the layers 20. The bumper layer spacers 21 are preferably composed of aluminum, although other suitable materials may also be utilized, if desired.

The cloud stopper 14 is preferably composed of a layer of aluminum 22 positioned adjacent a layer of RTV silicone adhesive 24 which is positioned adjacent an inner layer of graphite epoxy 26. The aluminum layer 22 is the outermost layer and is preferably approximately 0.012 inches thick while the RTV layer is the intermediate layer and is preferably approximately 0.007 inches thick and the graphite epoxy layer is the innermost layer and is preferably approximately 0.033 inches thick. Thus, the layers 22, 24 and 26 are preferably bonded together so as to provide an integral cloud stopper sheet 14. The aluminum layer 22 composition is sufficiently penetration resistant to absorb the small fragments resulting from high velocity collisions with the bumper 12, while the graphite epoxy layer 26 is sufficiently strong to resist fracture and sufficiently stiff to preclude large deformations under the impulse load delivered by the impacting particle.

The fragment stopper 16 is preferably a single layer composed of a material (and of a thickness) that is sufficiently puncture-resistant to withstand collision with relatively low velocity particles on the order of one or two kilometers per second. Thus, the fragment stopper is preferably composed of a fibrous material which is capable of absorbing and containing the particles upon collision therewith. The fibrous material of the fragment stopper 16 is preferably a polyethylene yarn composition woven without resin such as that sold under the trademark Spectra 1000 from Allied Fibers, which is a division of Allied Corporation U.S.A or under the trade designation Dyneema SK60 from Dyneema V. of Holland. Alternatively, the fragment stopper 16 may also be composed of an aramid fiber material such as Kevlar trademark registered to E.I. dupont de Nemours, Inc.

Figure 2:
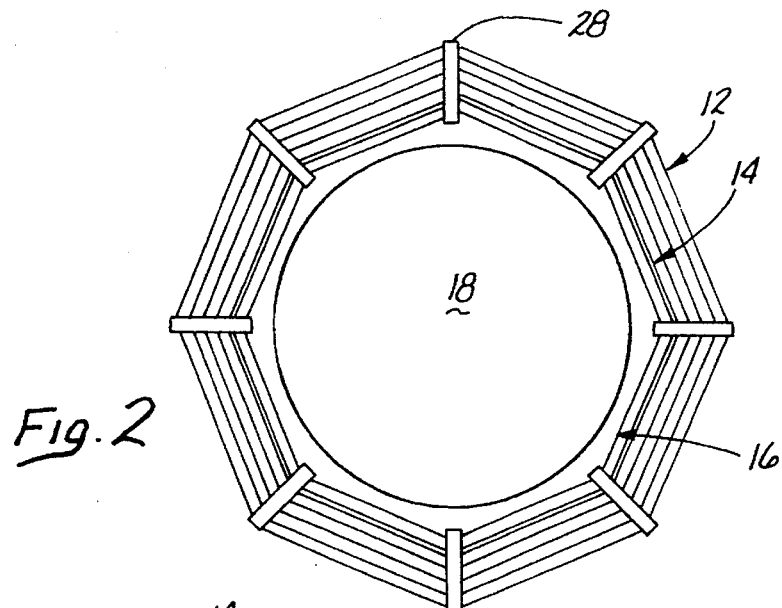
FIG. 2 is a cross-sectional view of the first embodiment of the present invention taken along lines 2—2 of FIG. 1 and showing the component structures thereof.

The elements 12, 14 and 16 are preferably spaced from each other, as shown in FIG. 2. The spacing between the bumper 12 and the cloud stopper 14 is preferably provided by a spacer 28 which is preferably a set of spacers 28. The set of spacers 28 is preferably integral with the bumper layer spacers 21. The set of spacers 28 preferably relatively positions the bumper element 12 and cloud stopper element 14 so that the separation distance measured from the outer surface 30 of the bumper 12 to the outer surface 32 of the cloud stopper element 14 is preferably approximately four inches. Each of the set of spacers 28 is preferably positioned so that it is generally forty-five degrees from the other spacers and so that the spacers 28 are diametrically opposed to each other, as shown in FIG. 2. However, other suitable locations for the set of spacers 28 may be suitable, as well. The set of spacers 28 provides spacing between the bumper 12 and cloud stopper 14 sufficient to prevent critical damage to the cloud stopper 14 from ensuing after the bumper element 12 has been impacted by a high velocity particle.

Spacer 28 which is preferably a set of spacers 28 is also provided in order to attach the fragment stopper element 16 a selected distance from the inner surface of the cloud stopper 14. The set of spacers 28 preferably positions the cloud stopper 14 and fragment stopper element 16 so that outer surface 32 of the cloud stopper 14 is spaced approximately one inch from an outer surface 36 of the fragment stopper 16. However, other spacings between the cloud stopper 14 and fragment stopper 16 may also be used. The fragment stopper element 16 is preferably thin relative to the spacing between the cloud stopper 14 and the fragment stopper 16, but the thickness of the fragment stopper 16 can vary according to the application and the size, velocity, etc. of the impacting particles from which protection is desired. As shown in FIG. 2, the bumper element 12, the cloud stopper element 14 and fragment stopper element 16 are preferably generally octagonal in cross-section and concentric.

Since the spacecraft 18 may be composed of a very thin material incapable of sustaining impact loads or may be otherwise very sensitive to impact forces, the bumper element 12, cloud element 14 and fragment element 16 are preferably not mounted directly onto the main structures of the spacecraft 18 but rather mounted onto spacecraft structures more capable of sustaining impact forces. Consequently, the elements 12, 14 and 16 are preferably mounted onto hardpoint end portions 38 of the spacecraft 18 via mounts 40. These hardpoint portions 38 may include piping or other suitable spacecraft structures that may be less sensitive to impact loads than the spacecraft's main structure.

The set of spacers 28 (and the bumper layer spacers 21) are preferably simply eight beams extending longitudinally the entire length of the shield 10 and may be in the shape of I-beams. However, there may be more or less than this number of spacers 28 in the set of spacers 28, and the set of spacers 28 may also have other suitable shapes, if desired. In addition, the set of spacers 28 are preferably composed of aluminum for simplifying fabrication processes, etc. of the shield 10. However, carbon graphite composites or other suitable lightweight compositions may also be utilized, if desired. The set of spacers 28 are preferably generally thin and narrow because they function simply to provide spacing between the elements 12, 14 and 16.

Figure 4:
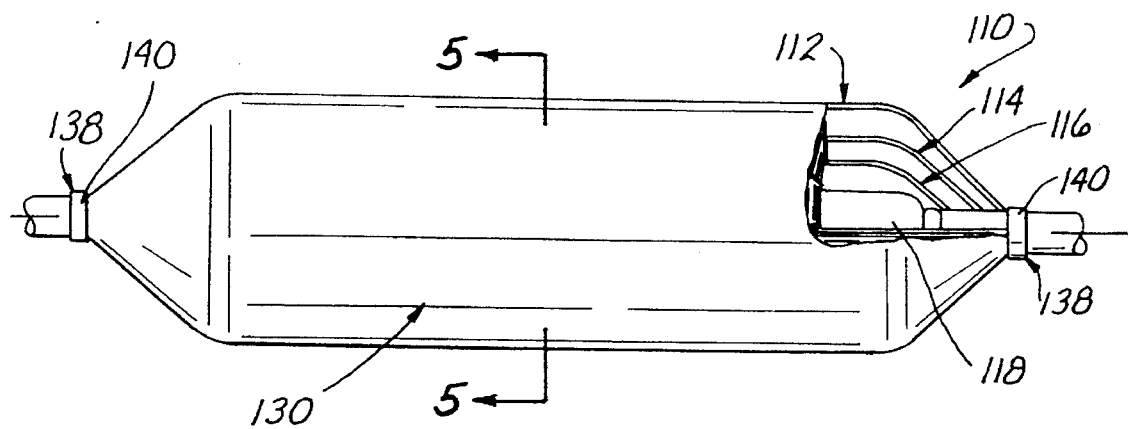
FIG. 4 is a perspective view of a second embodiment of the shield of the present invention showing the shield mounted on a spacecraft at hardpoint end structure portions thereof and showing a portion of the shield cut away to illustrate relative positioning of components thereof.
Figure 5:
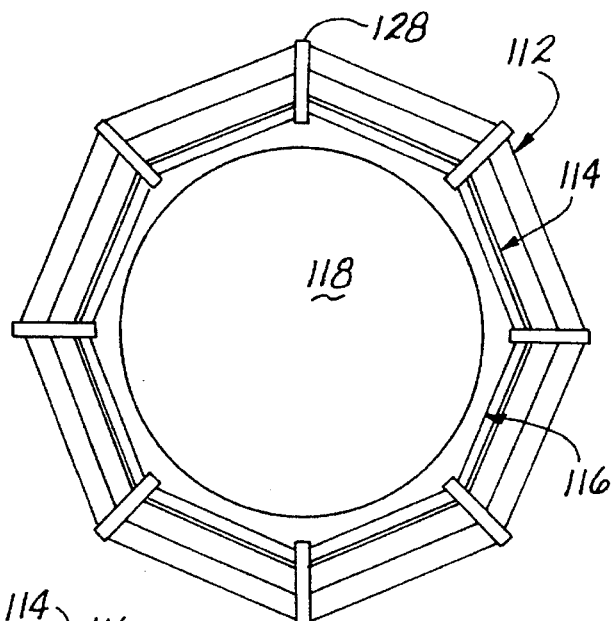
FIG. 5 is a cross-sectional view of the second embodiment of the shield of the present invention taken along lines 5—5 of FIG. 4 showing the component structures thereof.
Figure 6:
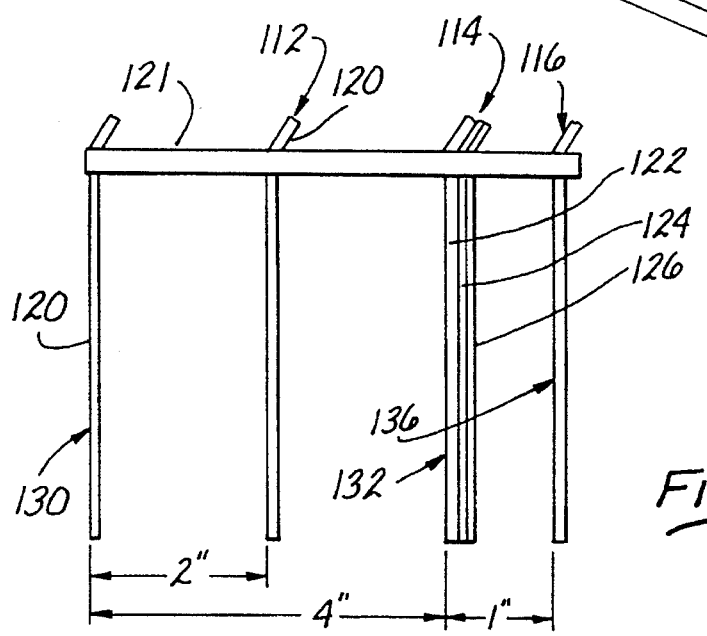
FIG. 6 is a sectional view of the bumper, cloud stopper and fragment stopper elements of the second embodiment of the present invention showing the layers thereof.

FIGS. 4, 5 and 6 show a second embodiment 110 of the invention. Embodiment 110 is generally similar to embodiment 10, except that bumper element 112 (outer structure 112) is preferably composed of two sheets 120 of tin. Tin is utilized in the bumper element 112 because the tin composition melts the impacting projectile as well as the tin so that no tin fragments are produced except for molten tin drops which spray out at approximately a forty five degree angle from the point of impact. Thus, due to the utilization of tin, the impact forces are spread out over a relatively large area. As a result, the impact does not present a significant concentrated impulsive force load to the underlying structures 114 and 116. The tin of the bumper element 112 is preferably a high purity tin (of approximately 99.99% purity) which provides it with an extremely low melting point so that it has the ability to produce only molten or vaporized material from the impact.

In addition to the utilization of tin in the bumper 112, embodiment 110 is different from embodiment 10 in the composition of the cloud stopper 114. Cloud stopper 114 is preferably composed of an outer layer 122 of titanium, an intermediate layer of RTV adhesive 124 and an inner layer of graphite epoxy layer 126 bonded together into an integral unitary sheet. Except as described, cloud stopper element 114 and layers 122, 124 and 126 are identical to cloud stopper element 14 and layers 22, 24 and 26.

As with embodiment 10, embodiment 110 is not mounted on main structures of the spacecraft 118. Instead, the shield 110 is preferably mounted onto hardpoint end structures 138 of the spacecraft 118 via suitable mounts 140 in order to prevent or at least minimize transfer of impact forces to main structures of the spacecraft 118.

Embodiment 110 also includes a set of spacers 128. The set of spacers 128 preferably separate the outer surface 130 of the bumper 112 from the outer surface 132 of the cloud stopper element 114 a distance of preferably approximately four inches. The bumper layer spacers 121 preferably separate the two sheets 120 of tin from each other by a distance of approximately two inches. However, more than this number of sheets 120 of tin may be utilized and equally spaced, if desired. Bumper layer spacers 121 are preferably integral with the set of spacers 128. In addition, the set of spacers 128 preferably separate the outer surface 132 of the cloud stopper element 114 from the outer surface 136 of the fragment stopper element 116 a distance of preferably approximately one inch, as with embodiment 10. Alternatively, the spacing distance between the fragment stopper element 116 and cloud stopper element 114 may be reduced (or adjacent and in contact with each other) or increased in order to provide a desired degree of protection. If the spacing distance between elements 114 and 116 (as well as between elements 14 and 16) is reduced, the thickness of the fragment stopper element 114 (as well as element 14) must be increased in order to maintain the same degree of effectiveness in stopping impacting fragments. Except as described, the elements of embodiment 110 are identical to the elements of embodiment 10.

Although the embodiments 10 and 110 have been described as including elements 12 and 112, 14 and 114 and 16 and 116 which are generally octagonal in cross-sectional shape, other suitable shapes may also be utilized, if desired. For example, the elements 12, 14 and 16 may be oval, rectangular or triangular in cross-sectional shape.

Accordingly, there has been provided, in accordance with the invention, a spacecraft shield which is generally more effective in providing protection against a variety of impacting particles having a relatively wide range of velocities and which is also generally lightweight relative to the degree of protection provided. The spacecraft shield thus fully satisfies the objectives set forth above. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

What is claimed is:

1. A spacecraft having a shield for protecting the spacecraft from impacting particles, the shield comprising:

a bumper element generally enclosing the spacecraft and comprising a plurality of spaced layers;

a cloud stopper element generally enclosing the spacecraft and located within the bumper element, the cloud stopper element being separated from the bumper element and comprising a metallic layer and an adhesive layer; and a fragment stopper element generally enclosing the spacecraft and located within the cloud stopper element.

2. A spacecraft as recited in claim 1, wherein said cloud stopper element further comprises a graphite epoxy layer and the metallic, adhesive, and graphite epoxy layers are bonded together to form an integral sheet.

3. A spacecraft as recited in claim 1, wherein said metallic layer comprises aluminum.

4. A spacecraft as recited in claim 1, wherein said metallic layer comprises titanium.

5. A spacecraft as recited in claim 1, wherein the plurality of layers of said bumper element are comprised of a fabric.

6. A spacecraft as recited in claim 5, wherein the fabric is a woven fibrous ceramic material.

7. A spacecraft as recited in claim 5, wherein the bumper element comprises four fabric layers.

8. A spacecraft as recited in claim 1, wherein the fragment stopper element comprises a single layer.

9. A spacecraft as recited in claim 8, wherein the fragment stopper layer comprises a fibrous material.

10. A spacecraft as recited in claim 9, wherein the fibrous material comprises a woven polyethylene yarn composition.

11. A spacecraft as recited in claim 9, wherein the fragment stopper element comprises an aramid fiber material.

12. A spacecraft as recited in claim 1, wherein the bumper element is generally cylindrical.

13. A spacecraft as recited in claim 12, wherein the bumper element is generally octagonal in cross-section.

14. A spacecraft as recited in claim 1, wherein the plurality of layers of said bumper element are comprised of tin.

15. A spacecraft as recited in claim 1 and further comprising a mount for mounting said bumper, cloud stopper, and fragment stopper elements onto a hardpoint location on the spacecraft.

16. A spacecraft as recited in claim 1, wherein the bumper element and cloud stopper element are spaced approximately four inches apart.

17. A spacecraft as recited in claim 1, wherein the cloud stopper element and the fragment stopper element are spaced approximately one inch apart.

18. A spacecraft as recited in claim 1, wherein the bumper element comprises a first plurality of spacer elements oriented in a direction generally tangential to the orientation of the bumper element layers, for spacing the layers from one another by a desired distance.

19. A spacecraft as recited in claim 1, and further comprising a second plurality of spacer elements oriented in a direction generally tangential to the orientation of the bumper element and the cloud stopper element, for separating the bumper element and the cloud stopper clement by a desired distance.

20. A spacecraft as recited in claim 1, and further comprising a plurality of integral spacer elements which are adapted to separate the bumper element layers from one another by a desired distance, to separate the bumper element from the cloud stopper element by a desired distance, and to separate the cloud stopper element from the fragment stopper element by a desired distance, the spacer elements being oriented in a direction generally transverse to the orientation of the bumper element, the cloud stopper element and the fragment stopper element.

21. A spacecraft as recited in claim 20, wherein the plurality of spacer elements are and spaced approximately 45 degrees apart about the circumference of the shield.

* * * * *